United States Patent Office 3,497,528
Patented Feb. 24, 1970

3,497,528
3-AMINOALKYL AND 3-AMINO DERIVATIVES OF CYCLOPENTA[β]THIANAPHTHENE
John T. Suh, Mequon, Wis., assignor to Colgate-Palmolive Company, New York, N.Y., a corporation of Delaware
No Drawing. Filed Dec. 7, 1966, Ser. No. 599,744
Int. Cl. C07d 63/22; A61k 27/00
U.S. Cl. 260—330.5                5 Claims

ABSTRACT OF THE DISCLOSURE

The compounds are 1H-3-(substituted aminoalkyl)-cyclopenta[β]thianaphthene derivatives which are useful as tranquilizers of the central nervous system depressant type. Representative of the compounds disclosed is 1H-3-(γ-dimethylaminopropyl)cyclopenta[β]thianaphthene and 1H - 3 - (γ-dimethylaminopropyl)cyclopenta[β]thianaphthene-3-ol.

---

The present invention relates to novel derivatives of cyclopenta[β]thianaphthene-3-ones, methods of preparing such compounds, pharmaceutical compositions containing them and therapeutic methods employing them.

The novel compounds of the present invention have the following formula

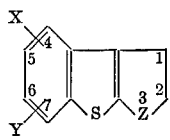

wherein X and Y are hydrogen such as chloro, bromo or fluoro, hydroxy, nitro, lower alkyl such as methyl, ethyl, propyl or isopropyl, lower alkoxy such as methoxy, ethoxy or propoxy and trifluoromethyl, Z is

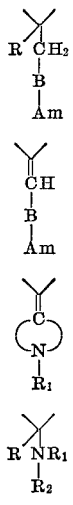

or

R is hydrogen or hydroxy, $R_1$ is hydrogen, a lower alkyl of 1 to 4 carbon atoms, or an aralkyl of 7 to 11 carbon atoms such as benzyl, phenethyl and phenyl-isopropyl, $R_2$ is $R_1$ $$-\overset{NH}{\overset{\|}{C}}-NN_2$$

or —CH$_2$—B—Am, B is an alkylene of 1 to 5 and Am is

in which $R_3$ and $R_4$ may be hydrogen, lower alkyl of 1 to 8 carbon atoms, hydroxy-lower alkyl, an alkoxy alkyl, an alkenyl of 3 to 6 carbons such as allyl, 3-butenyl or 5-hexenyl, an aryl such as phenyl and nuclear substituted phenyl, an aralkyl of 7 to 11 carbon atoms, particularly phenyl-lower alkyl such as benzyl, phenyl-ethyl, phenyl-isopropyl and phenyl-butyl, a cycloalkyl of 3 to 7 carbon atoms such as cyclohexyl, a cycloalkyl-lower alkyl in which the cycloalkyl has 3 to 7 carbon atoms such as cyclohexyl methyl and groups in which $R_3$ and $R_4$ are joined together to form amino groups in which the nitrogen is part of a cyclic group such as morpholino, pyrrolidino, piperidino, a lower alkyl piperazino such as N-methyl piperazino, N-phenyl-lower alkyl piperazino or N-hydroxy-lower alkyl piperazino, or Am is

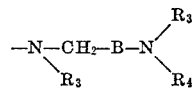

in which

is a tertiary amino group

is a cyclic amine group, including such groups as N-lower alkyl-2,3 or 4-piperidyls such as N-methyl-3-piperidyl, N-ethyl-4-piperidyl, N-ethyl-2-piperidyl and N-isopropyl-3-piperidyl, N-(di-lower alkyl amino-lower alkyl)-2,3 or 4-piperidyls such as N-(beta-dimethylaminopropyl)-4-piperidyl, N-(beta-diethylaminoethyl)-3-piperidyl and N-(beta - dimethylaminopropyl)-2-piperidyl, N-phenyl-lower alkyl-3 or 4-piperidyls such as N-benzyl-3-piperidyl, N-phenylethyl-4-piperidyl and N-phenylpropyl-3-piperidyl, 2-piperidyl, 3-piperidyl and 4-piperidyl, 2-pyrrolidyl, 3-pyrrolidyl, N-lower alkykl-2 or 3-pyrrolidyls such as N-methyl-2-pyrrolidyl, N-ethyl-3-pyrrolidyl, N-propyl-4-pyrrolidyl, and N-phenyl-lower alkyl-2 or 3-pyrrolidyls such as N-benzyl-2-pyrrolidyl and N-phenyl-ethyl-3-pyrrolidyl and D is COOH, CO$_2$R$_1$ or CN.

The compounds of the present invention may be conveniently prepared by employing as the starting material a 1H-cyclopenta[β]thianaphthene-3-one of the formula

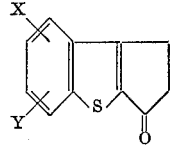

The ketones may be conveniently prepared as described in the literature (M.P. Cagniant and Mme. P. Cagniant: Bulletin de la Societe Chimique de France, pages 185–190, (1953)).

Representative of the ketones which may be employed as starting materials are the following:

1H-cyclopenta[β]thianaphthene-3-one,
5-methoxy-1H-cyclopenta[β]thianaphthene-3-one,
6-chloro-1H-cyclopenta[β]thianaphthene-3-one,
6-bromo-1H-cyclopenta[β]thianaphthene-3-one, and
7-trifluoromethyl-1H-cyclopenta[β]thianaphthene-3-one.

The compounds of the present invention which have the following formula

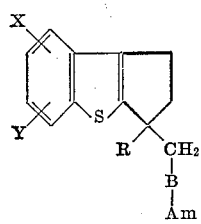

in which R is hydroxy or hydrogen and B is methylene may be readily prepared by treating the starting ketone first with t-butyl acetate and diethylamino magnesium bromide to form the corresponding ester, followed by treatment with lithium aluminum hydride to form the corresponding alcohol, which in turn is treated with tosyl chloride and a suitable amine such as a disubstituted amine under conventional conditions to form the compounds in which R is hydroxy, which, if desired, can be reduced to form the compounds in which R is hydrogen or dehydrated to form the corresponding olefin.

The above described process may be illustrated as follows:

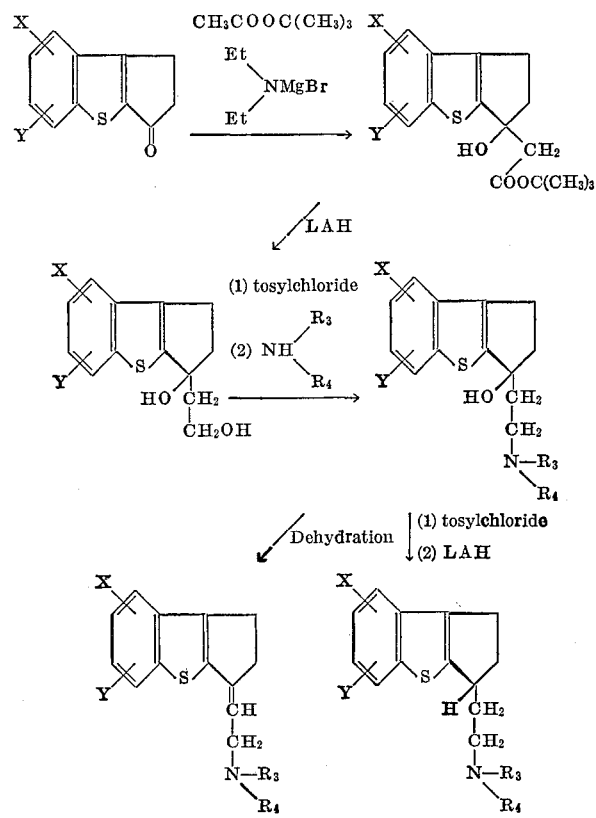

wherein $R_3$ and $R_4$ are other than hydrogen and X and Y represent groups that do not partake in or interfere with the reactions.

Representative of the compounds which may be prepared by the described process are the following:

1H - 3 - ($\beta$ - aminoethylidene)-cyclopenta[$\beta$]thianaphthene,

1H - 6 - chloro - 3 - ($\beta$ - aminoethylidene) - cyclopenta[$\beta$]thianaphthene, 1H - 5 - methoxy - 3 - ($\beta$ - aminoethylidene)-cyclopenta[$\beta$]thianaphthene, 1H - 7 - trifluoromethyl - 3 - ($\beta$ - aminoethylidene)-cyclopenta[$\beta$]thianaphthene, 1H - 6 - bromo - 3 - ($\beta$ - aminoethylidene) - cyclopenta[$\beta$]thianaphthene, 1H - 3 - ($\beta$ - dimethylaminoethylidene) - cyclopenta[$\beta$]thianaphthene, 1H - 3 - ($\beta$ - aminoethyl) - cyclopenta[$\beta$]thianaphthene, 1H - 6 - chloro - 3 - ($\beta$ - aminoethyl) - cyclopenta[$\beta$]thianaphthene, 1H - 6 - bromo - 3 - ($\beta$ - aminoethyl) - cyclopenta[$\beta$]thianaphthene, and 1H - 7 - trifluoromethyl - 3 - ($\beta$ - aminoethyl) - cyclopenta[$\beta$]thianaphthene.

The compounds of the invention which have the following formula

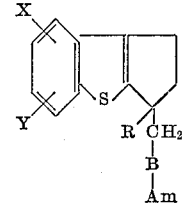

in which R is hydroxy or hydrogen and B is an alkylene of 1 to 5 carbon atoms may be conveniently prepared by treating the starting ketone with a suitable Grignard reagent or organo lithium compound in a suitable inert nonaqueous solvent such as tetrahydrofuran, etc. The resulting alcohol can then be treated with aluminum chloride and lithium aluminum hydride or with tosylchloride followed by lithium aluminum hydride to form the compounds in which R is hydrogen.

The above described process may be diagrammed as follows:

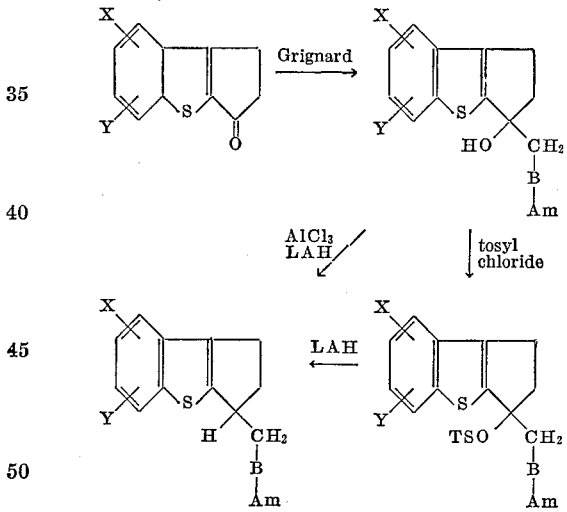

Representative of the Grignard reagents and organo lithium compounds which can be employed in this process are the following:

dimethylaminopropyl magnesium chloride,
diethylaminopropyl magnesium bromide,
4-picolyl lithium,
1-methyl-4-piperidyl magnesium bromide,
diallylaminoisopropyl magnesium chloride,
N-methyl-N-benzylaminopropyl magnesium chloride,
diphenethylaminoethyl magnesium chloride,
dicinnamylaminoethyl magnesium chloride,
pyrrolidinoethyl magnesium chloride,
homopiperidinopropyl magnesium chloride,
piperidinomethyl magnesium chloride, and
4-methylpiperazinopropyl magnesium chloride.

The disubstituted aminoalkyl metal halides are Grignard reagents which may be produced by the conventional processes such as those disclosed in U.S. Patent No. 2,996,503.

The reaction between the disubstituted aminoalkyl metal halides and the 1H-cyclopenta[$\beta$]thianaphthene-3-one is conveniently effected by bringing the reactants together under the conditions generally used for reacting a Grignard reagent with a ketone to form a tertiary alcohol. The reactants are advisably combined in an anhydrous medium such as ethyl ether, tetrahydrofuran, or ethyl ether with benzene. After the reactants have been brought together the mixture can be heated, preferably, at reflux, to promote the reaction. When the reaction is terminated water may be added to hydrolyze the Grignard adduct to the desired tertiary alcohol. The resulting product may then be isolated from the mixture by conventional means such as by evaproating the solvent. The product may then be recrystallized from a suitable medium, such as benzene, if desired. The same conditions may be used when an organo lithium compound is employed in the reaction.

Illustrative of the 1H-3-(disubstituted aminoalkyl)cyclopenta[β]thianaphthene-3-ol which may be produced by the described process are the following:

1H-3 - (γ - dimethylaminopropyl)cyclopenta[β]thianaphthene-3-ol,

1H - 3 - (β-diethylaminoethyl)cyclopenta[β]thianaphthene-3-ol,

1H - 3 - (γ-piperidinopropyl)cyclopenta[β]thianaphthene-3-ol, 1H-3 - (γ-N-methyl-N-benzylaminopropyl)cyclopenta[β]thianaphthene-3-ol, 1H - 3 - (β-pyrrolidinoethyl)cyclopenta[β]thianaphthene-3-ol, 1H-3 - (γ - dicyclohexylaminopropyl)cyclopenta[β]thianaphthene-3-ol, 1H - 3 - [4' - (N-methyl)piperidyl]cyclopenta[β]thianaphthene-3-ol, 1H-5-chloro - 3 - (γ-dimethylaminopropyl)cyclopenta[β]thianaphthene-3-ol, 1H-6-benzyloxy - 3 - (γ-dimethylaminopropyl)cyclopenta[β]thianaphthene-3-ol, and 1H-5-trifluoromethyl-3-(γ - N - methylpiperazinopropyl)cyclopenta[β]thianaphthene-3-ol.

Representative of the compounds which may be obtained by treating the corresponding 3-ols with lithium aluminum hydride and aluminum chloride or alternatively, with tosylchloride folloyed by treatment with lithium aluminum chloride are the following:

1H-3 - (γ - dimethylaminopropyl)cyclopenta[β]thianaphthene, 1H-3 - (β - diethylaminoethyl)cyclopenta[β]cyclopenta[β]thianaphthene, 1H-3 - (γ - dibenzylaminopropyl)cyclopenta[β]thianaphthene, 1H-3 - (γ - N-methyl-N-benzylaminopropyl)cyclopenta[β]thianaphthene, 1H - 3 - (γ-piperidinopropyl)cyclopenta[β]thianaphthene, 1H-3 - (β - pyrrolidinoethyl)cyclopenta[β]thianaphthene, 1H - 3 - (γ - dicyclohexylaminopropyl)cyclopenta[β]thianaphthene, 1H-5-chloro - 3 - (γ-dimethylaminopropyl)cyclopenta[β]thianaphthene, 1H-6-benzyloxy - 3 - [4'-(N-methyl)piperidyl]cyclopenta [β]thianaphthene, and 1H-5-hydroxy-3 - (β - diethylaminoethyl)cyclopenta[β]thianaphthene.

The compounds in which Am is

and $R_3$ is hydrogen and $R_4$ is not hydrogen may be conveniently prepared by subjecting the corresponding compound in which $R_3$ is benzyl and $R_4$ is not hydrogen or benzyl to catalytic cleavage of the benzyl group.

Similarly, the compounds in which Am is $NH_2$ may be prepared by subjecting the corresponding compound in which both $R_3$ and $R_4$ are benzyl to catalytic cleavage of the benzyl groups.

The catalytic cleavage of the benzyl group may be reading effected by dissolving the N-mono or dibenzyl derivative in a suitable medium and adding a catalyst, such as palladium on carbon, and hydrogen under pressure, up to about 100 p.s.i.

The cleavage may also be effected by reacting the appropriate benzyl derivative with a chloroformate such as methyl chloroformate, ethyl chloroformate or the like, to form the corresponding N-carboalkoxy derivative, and subjecting that compound to hydrolysis conditions.

Representative of the compounds which may be prepared in the described manner are the following:

1H-3-(γ-methylaminopropyl)cyclopenta[β]thianaphthene, 1H-3-(γ-ethylaminopropyl)cyclopenta[β]thianaphthene, 1H-3-(β-methylaminoethyl)cyclopenta[β]thianaphthene, 1H-3-(β-ethylaminoethyl)cyclopenta[β]thianaphthene, 1H-3-(γ-aminopropyl)cyclopenta[β]thianaphthene, 1H-3-(β-aminopropyl)cyclopenta[β]thianaphthene, 1H-5-fluoro-3-(γ-aminopropyl)cyclopenta[β]thianaphthene, and 1H-6-trifluoromethyl-3-(β-aminoethyl)cyclopenta[β]thianaphthene.

The compounds of the formula

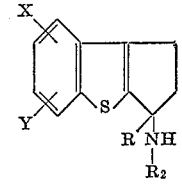

in which $R_2$ is hydrogen are readily formed by converting the starting ketone to the corresponding oxime and then treating the oxime with lithium aluminum hydride to form the primary amine.

The ketones are converted to the oximes by reacting them with hydroxylamine, advisably in an organic reaction medium in which the reactants are soluble. The hydroxylamine can be produced in situ by the neutralization of a hydroxylamine salt such as the hydrochloride. Inorganic bases such as alkali metal hydroxides, carbonates and bicarbonates, as well as organic bases such as pyridine, can be used to neutralize the acid released from the hydroxylamine salt.

The described process for preparing the primary amines may be diagrammed as follows:

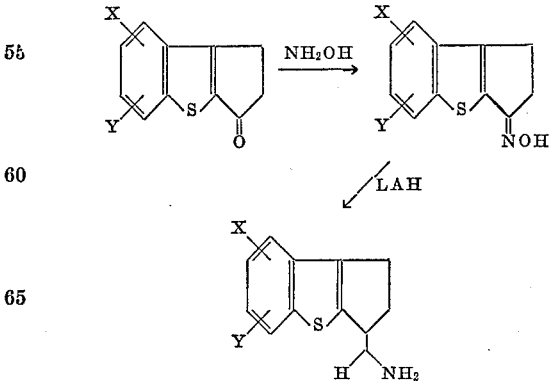

Representative of the compounds which may be prepared in the above described manner are the following:

1H-3-aminocyclopenta[β]thianaphthene, 1H-3-amino-5-chlorocyclopenta[β]thianaphthene, 1H-3-amino-5-hydroxycyclopenta[β]thianaphthene, and 1H-3-amino-6-bromocyclopenta[β]thianaphthene.

A wide variety of amine derivatives may be prepared from the above described primary amines by conventional techniques. For example, the compounds in which $R_1$ and/or $R_2$ are alkyl or aralkyl may be prepared by treating the primary amine with an alkyl halide, and the compounds in which $R_2$ is —$CH_2$—B—Am may be prepared by treating the amine with a suitable aminoalkyl ester or alternatively treating the primary amine with an aminoalkyl acyl halide followed by treatment with lithium aluminum hydride. The compounds in which $R_1$ and $R_2$ are both methyl may be prepared by treating the amine with formaldehyde and formic acid.

The above described processes may be illustrated as follows:

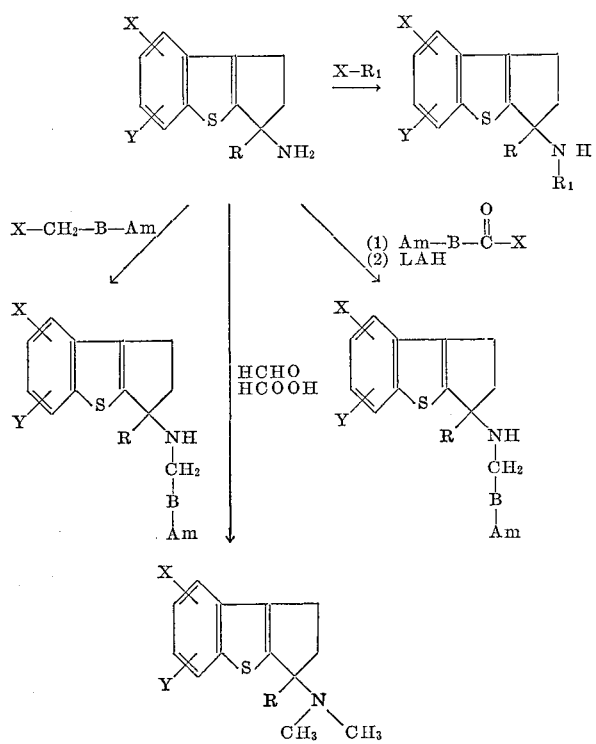

in which X is a reactive halide and $R_1$ is not hydrogen, and all other symbols are as previously defined and represent groups which do not partake in or interfere with the reactions.

The guanidino derivative may be readily prepared by treating a primary amine with methyl pseudothiourea in 70% aqueous ethanol under reflux conditions.

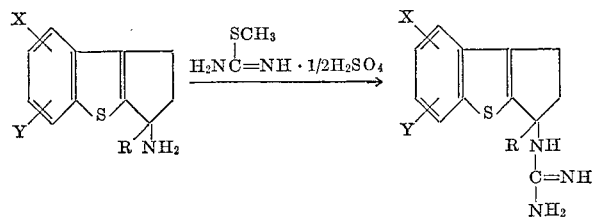

in which all symbols are as previously defined and represent groups that do not partake in or interfere with the reaction.

Representative of the compounds which may be prepared by the above described processes are the following:

1H-3-dimethylaminocyclopenta[β]thianaphthene,
1H-3-guanidinocyclopenta[β]thianapthene,
1H-3-(γ-dimethylaminopropylamino)-cyclopenta[β]thianapthene, and
1H-3-methylaminocyclopenta[β]thianaphthene.

The compounds in which Am is

and $R_3$ is hydrogen or $R_3$ and $R_4$ are hydrogen may be prepared by subjecting the corresponding compounds in which $R_3$ and/or $R_4$ are benzyl to cleavage of the benzyl groups as was previously described.

Representative of the compounds which can be prepared in the described manner are the following:

1H-3-(γ-methylaminopropylamino)-cyclopenta[β]thianaphthene, and
1H-3-aminopropylaminocyclopenta[β]thianaphthene.

The compounds of the invention which have the following formula

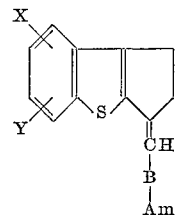

in which B is an alkylene of 1 to 5 carbon atoms may be prepared by the dehydration of the previously described IH - 3 - (disubstituted aminoalkyl) - cyclopenta[β]thianaphthene-3-ols or directly from the starting ketone. The dehydration procedure may be readily effected by treating the 3-ol with a conventional dehydrating agent such as acetyl chloride, thionyl chloride, acetic anhydride, potassium bisulfate and concentrated hydrochloric acid. The reaction is generally promoted by the use of reflux conditions.

The processes may be illustrated as follows:

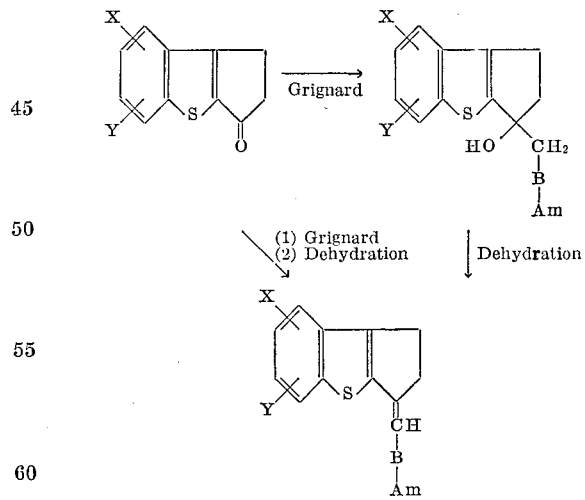

Representative of the compounds which may be obtained by the described process are the following:

1H - 3 - (γ-dimethylaminopropylidene) - cyclopenta[β]thianaphthene,
1H - 3 - (β - diethylaminopropylidene) - cyclopenta[β]thianaphthene,
1H - 3 - (γ - N - methyl-N-benzylaminopropylidene)-cyclopenta[β]thianaphthene,
1H - 3 - (β-pyrrolidinopropylidene)-cyclopenta[β]thianaphthene,
1H - 3 - (γ - dicyclohexylaminopropylidene)-cyclopenta[β]thianaphthene,
1H - 3 - (γ - 4 - methylpiperazinopropylidene)-cyclopenta[β]thianaphthene, 1H - 5 - chloro - 3 - [4'-(N-methyl)piperidylene]cyclopenta[β]thianaphthene, 1H - 6 - trifluoromethyl - 3 - [3'-(N-methyl)piperidylene]cyclopenta[β]thianaphthene, and 1H - 5 - methoxy - 3 - (γ-dimethylaminopropylidene)cyclopenta[β]thianaphthene.

The compounds in which B is methylene may be prepared as described previously or by treating the ketone starting material with triethylphosphononitrile to form the corresponding methylene nitrile derivative and then reducing the nitrile with an agent such as lithium aluminum hydride to form the primary amine which, of course, may be converted by conventionla means into a wide variety of secondary and tertiary amines.

This process may be illustrated as follows:

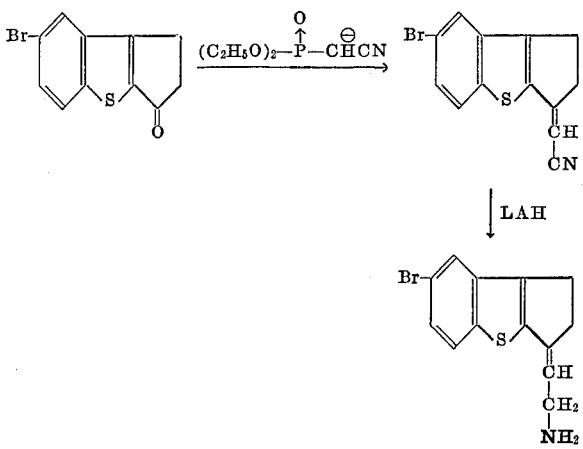

The novel compounds of the formula

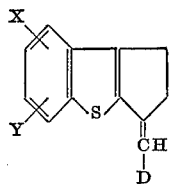

in which D is $CO_2R_1$ may be prepared by treating the ketone starting material with triethylphosphonoacetate to form the ethyl ester, hydrolyzing the ethyl ester by treating it with an alkali hydroxide to form the free acid. If desired, the free acid may be then treated with a secondary amine such as dimethylamine to form the amide which upon treatment with lithium aluminum hydride yields the substituted amine. The compounds in which D is $CO_2R_1$ thus serve as convenient intermediates for the preparation of the corresponding amines.

The processes may be illustrated as follows:

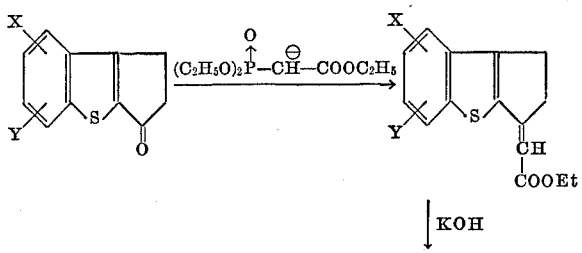

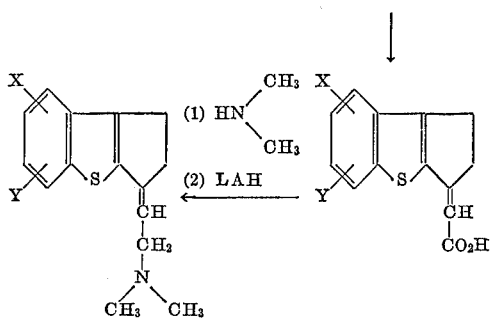

Representative of the compounds which may be prepared by this process are the following:
thene, 1H - 3 - (carbethoxymethylene)cyclopenta[β]thianaphthene, 1H - 3 - (carboxymethylene)cyclopenta[β]thianaphthene, 1H - 5 - fluoro - 3 - (carbethoxymethylene)cyclopenta[β]thianaphthene, 1H - 6 - chloro - 3 - (carboxymethylene)cyclopenta[β] thianaphthene, 1H - 5 - bromo - 3 - (carboxymethylene)cyclopenta[β] thianaphthene, and 1H - 5 - trifluoro-3-(carbethoxymethylene)cyclopenta[β]thianaphthene.

Acid addition salts of the compounds of the present invention, capable of forming such salts, may be conveniently prepared by contacting the compounds with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the compounds which are capable of forming such salts with a suitable alkylating agent such as dimethyl sulfate or an alkyl halide such as methyl chloride, methyl iodide or ethyl bromide.

The novel compounds of the present invention, which are amines, and their pharmaceutically acceptable salts have utility as antihypertensive, tranquilizer and antidepressant agents. In addition, they exhibit a psychopharmacologic effect exemplified by a reduction in the antisocial behavior in aggressive animals. They are also useful as intermediates in the preparation of more complex pharmaceutical and chemical compounds.

The compounds are preferably combined with one or more suitable pharmaceutical diluents and formed into unit dosage forms. Such dosage forms provide suitable means for oral and parenteral administration.

The pharmaceutical diluents which may be employed may be either liquid or solid, but the preferred liquid carrier is water. In the event the compound is not soluble in water a pharmaceutically acceptable organic solvent such as propylene glycol may be employed.

Solid pharmaceutical diluents such as starch, sugar and talc can be utilized to form powders which can in turn be used as such or may be tableted or encapsulated. In addition to the forementioned material, a wide variety of conventional pharmaceutical lubricants, disintegrating agents, flavoring agents and the like may also be employed.

The unit dosage forms may contain a concentration of 0.1% to 10% or more by weight of one or more of the novel compounds. Generally, such dosage forms will contain about 5 to 150 mg. of the active ingredients. One or more of such dosage forms may be administered daily.

The following examples are presented to illustrate this invention.

EXAMPLE 1

1H-cyclopenta[β]thianaphthene-3-one

A solution of 2.7 g. (0.0131 mole) of β(3-thianaphthenyl)propionic acid in 50 ml. of thionyl chloride is allowed to reflux for 25 minutes and the excess thionyl chloride is distilled in vacuo. To the residue in 50 ml. of anhydrous benzene is added in portions 3 g. of anhydrous aluminum chloride with cooling and the reaction mixture stirred overnight at room temperature. The reaction mixture is cooled and treated with ice water and 25 ml. of 10% hydrochloric acid solution. The organic layer is separated and the aqueous layer extracted with 50 ml. of benzene. The combined benzene solution is washed successively with water, saturated sodium bicarbonate, water, and dried over anhydrous sodium sulfate. The benzene solution is distilled in vacuo and the residue recrystallized from ethanol to give 1H-cyclopenta[β]thianaphthene-3-one, M.P. 160–161°.

*Analysis.*—Calcd. for $C_{11}H_8OS$: S, 17.03%. Found: S, 17.07%.

EXAMPLE 2

1H-cyclopenta[β]thianaphthene-3-one oxime

To a solution of 1.3 g. (0.069 mole) of the ketone of Example 1 in 100 ml. of ethanol is added with stirring a solution of 0.69 g. (0.01 mole) of hydroxylamine hyrochloride in 10 ml. of water and 0.8 g. (0.01 mole) of sodium acetate in 10 ml. of water. The reaction mixture is then allowed to reflux for 10 minutes and stirred overnight at room temperature. The reaction mixture is diluted with 100 ml. of water and the product filtered and recrystallized with dilute ethanol to give the oxime, M.P. 222°.

*Analysis.*—Calcd. for $C_{11}H_9NOS$: S, 15.78%. Found: S, 16.07%.

EXAMPLE 3

1H-3-aminocyclopenta[β]thianaphthene hydrochloride

To a suspension of 3.68 g. (0.1 mole) of lithium aluminum hydride in 150 ml. of tetrahydrofuran (THF) is added in portions 4.6 g. of the oxime and the mixture allowed to reflux for one hour and then stirred at room temperature for 2 hours. An additional 200 ml. of THF is added and the reaction mixture carefully decomposed with 20 ml. of water. The reaction mixture is filtered and the residue washed with THF. The combined solution is distilled in vacuo and the basic residue converted to the hydrochloride salt in ether. The salt is dissolved in 200 ml. of water, made basic with 5% sodium hydroxide solution, extracted with two 100 ml. portions of ether, and dried over anhydrous sodium sulfate. The basic residue is converted to the hydrochloride salt in ether and recrystallized from methanol-ether to give 1H-3-aminocyclopenta[β]thianaphthene hydrochloride, light brown powder, M.P. 261–263°.

*Aanalysis.*—Calcd. for $C_{11}H_{12}ClNS$: C, 58.54%; H, 5.36%; N, 6.52%; Cl, 15.71%. Found: C, 58.31%; H, 5.63%; N, 5.96%; Cl, 15.35%.

EXAMPLE 4

1H-3-(γ-dimethylaminopropyl)cyclopenta[β]-thianaphthene-3-ol hydrochloride

To the Grignard reagent prepared from 2.19 g. (0.9 mole) of magnesium and 10.9 g. (0.13 mole) of freshly distilled γ-dimethylaminopropyl chloride in 100 ml. of THF is added in portions a solution 8.5 g. (0.045 mole) of the ketone of Example 1 in 100 ml. of THF over ½ period. The reaction mixture is stirred at room temperature for 16 hours and decomposed with 20 ml. of saturated ammonium chloride. The reaction mixture is filtered and the residue washed with THF. The combined THF solution is distilled in vacuo and the basic residue dissolved in ether. The ether insoluble material is removed by filtration and the ether solution washed with water, dried over anhydrous sodium sulfate, and treated with anhydrous hydrogen chloride. The product is recrystallized from ethanol-ether to give 1H-3-(γ-dimethylaminopropyl)cyclopenta[β]thianaphthene-3-ol hydrochloride, light brown powder, M.P. 185–187°.

*Analysis.*—Calcd. for $C_{16}H_{22}ClNOS$: Cl, 11.37%. Found: Cl, 11.09%.

EXAMPLE 5

1H-3-(γ-dimethylaminopropylidene)cyclopenta[β]-thianaphthene hydrochloride

To the Grignard reagent prepared from 3.0 g. (0.12 mole) of magnesium and 14.9 g. (0.12 mole) of γ-dimethylaminopropyl chloride in 100 ml. of THF is added a solution of 11.5 g. (0.06 mole) of 1H-cyclopenta[β]-thianaphthene-3-one in 200 ml. of THF over 1¼ hours. The reaction mixture is stirred at room temperature for 16 hours and decomposed with 30 ml. of saturated ammonium chloride solution. The reaction mixture is filtered and the residue washed with THF. The combined THF solution is distilled in vacuo, and the ether solution washed with water, dried, and adjusted to pH 6 slowly with ethereal hydrogen chloride. The product is recrystallized once from ethyl alcohol and once from methyl alcohol and dried in vacuo at 110° to yield 1H-3(γ-dimethylaminopropylidene) cyclopenta [β] thianaphthene hydrochloride, M.P. 211–213°. After two recrystallizations from ethyl alcohol the product melted at M.P. 213–214.5°.

*Analysis.*—Calcd. for $C_{16}H_{20}ClNS$: C, 65.40%; H, 6.86%; N, 4.77%. Found: C, 64.90%; H, 7.00%; N, 4.67%.

EXAMPLE 6

1H-3-(carbethoxymethylene)cyclopenta[β]-thianaphthene

To a solution of 3.84 g. (0.08 mole) of 50% sodium hydride in 250 ml. of freshly distilled dimethoxyethane is added 17.9 g. (0.08 mole) of triethylphosphonoacetate dissolved in 30 ml. of dimethoxyethane within 15 minutes while maintaining the reaction temperature at 15–20°. The solution is stirred at room temperature for 1 hour after which 15 g. (0.08 mole) of finely ground 1H-cyclopenta[β]thianaphthene-3-one is added in portions within 10 minutes. The mixture is stirred at room temperature for 16 hours and refluxed for 2 hours. The mixture is cooled, poured into 3.5 liters of ice water, and cooled. The resulting solids are collected by filtration, dried, and extracted with 200 ml. of refluxing chloroform. The insoluble material is removed by filtration and the filtrate concentrated in vacuo to yield a dark solid which is dissolved in 100 ml. of ethanol. The insoluble material is again removed by filtration and the filtrate cooled to yield a crystalline solid which is recrystallized from ethanol to yield 1H-3-(carbethoxymethylene)cyclopenta[β]thianaphthene in the form of a gold brown crystaline solid, M.P. 137–139°.

*Analysis.*—Calcd. for $C_{15}H_{14}O_2S$: C, 69.74%; H, 5.47%. Found: C, 69.74%; H, 5.54%.

I claim:
1. A compound selected from compounds of the formula

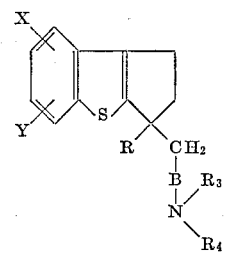

wherein X and Y are hydrogen, halo or trifluoromethyl, R is hydrogen or hydroxy, B is an alkylene of 1 to 5 carbon atoms, and $R_3$ and $R_4$ are selected from hydrogen, lower alkyl of 1 to 8 carbon atoms and phenyl-lower alkyl.

2. A compound of claim 1 in which X and Y are hydrogen.

3. A compound of claim 1 in which B is methylene or ethylene.

4. A compound of claim 1 in which $R_3$ and $R_4$ are selected from hydrogen, methyl, ethyl and benzyl.

5. A compound of claim 1 in which X and Y are hydrogen, B is ethylene, and $R_3$ and $R_4$ are methyl.

No references cited.

ALEX MAZEL, Primary Examiner

J. H. TURNIPSEED, Assistant Examiner

U.S. Cl. X.R.

260—240, 240.1, 247.1, 268, 293.4, 294.8, 326.82; 424—248, 250, 263, 267, 274

PO-1050
(5/69)

UNITED STATES PATENT OFFICE
CERTIFICATE OF CORRECTION

Patent No. 3,497,528                      Dated February 24, 1970

Inventor(s)   John T. Suh

It is certified that error appears in the above-identified patent and that said Letters Patent are hereby corrected as shown below:

Column 1, line 34 - after "hydrogen" insert -- halogen --.

Column 1, lines 69-71 - "$-\overset{NH}{\underset{\|}{C}}-NN_2$" should read -- $-\overset{NH}{\underset{\|}{C}}-NH_2$ --.

Column 5, line 42 - "folloyed" should read -- followed --.

Column 5, line 46 - delete "[β]cyclopenta".

Column 6, lines 63-38 -

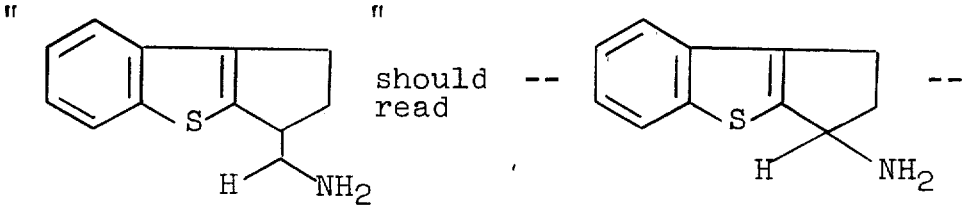

Column 9, line 13 - "conventionla" should read -- conventional --.

Column 10, line 16 - delete "thene".

Column 11, line 28 - "with" should read -- from --.

Column 11, line 59 - "(0.9 mole)" should read -- (0.09 mole) --.

Signed and sealed this 15th day of September 1970.

(SEAL)
Attest:

EDWARD M. FLETCHER, JR.
Attesting Officer

WILLIAM E. SCHUYLER, JR.
Commissioner of Patents